March 5, 1940.  M. BEREK  2,192,295
OPTICAL POLARIZING SYSTEM
Filed Oct. 27, 1937
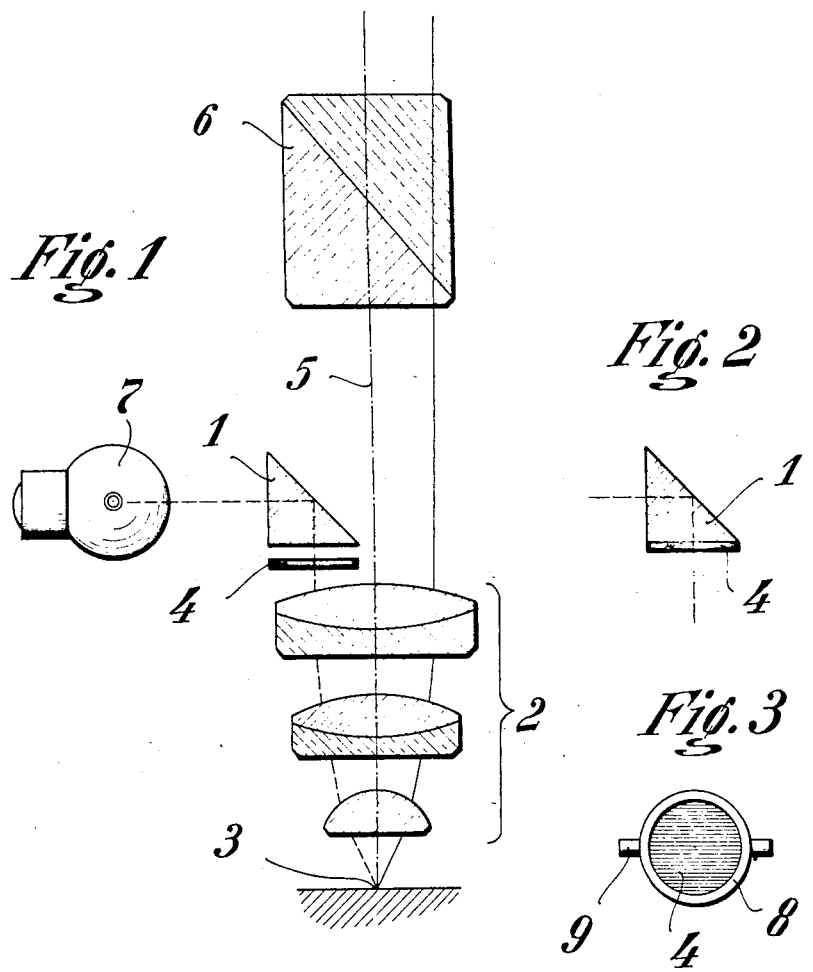
INVENTOR
*Max Berek*
BY
*Ivan E. A. Konigsberg*
ATTORNEY Patented Mar. 5, 1940

2,192,295

UNITED STATES PATENT OFFICE 2,192,295

OPTICAL POLARIZING SYSTEM

Max Berek, Wetzlar, Germany, assignor to Ernst Leitz, G. m. b. H., Wetzlar, Germany Application October 27, 1937, Serial No. 171,217
In Germany December 24, 1936

2 Claims. (Cl. 88—39)

This invention relates to light polarizing systems for use in microscopes for viewing objects by incident light, particularly for determining and measuring the optical characteristics in opaque or nearly opaque anisotropic substances.

Polarizing microscopes which are used for making such observations have heretofore been provided with a polarizing system in which the polarizing element is interposed between the light source and the deflecting prism. With such an arrangement the polarized light beam does not emerge from the deflecting prism homogeneously polarized because the deflecting prism disturbs the polarization conditions. Consequently it is impossible to depend upon the result of researches or observations conducted with such prior systems or arrangements.

It has been proposed to employ specially constructed deflecting prisms which are characterized by that the incoming polarized light after having been deflected remains still completely linearly polarized. Such prisms are relatively expensive and require great care in making, see German Patent No. 630,359, May 28, 1936.

The object of this invention is to provide a novel and improved polarizing optical system for observing and measuring the optical characteristics of opaque or nearly opaque anisotropic substances by incident light, such system being characterized by that the polarizing element is interposed between the deflecting prism and the object, the polarizing element being preferable a plate formed element or sheet or a polarizing foil. The polarizing optical system according to this invention is further characterized by that the polarizing element is located in or near the exit pupil of the objective and that the illuminating ray pass inside the bundle of the image forming rays of the objective. In the accompanying drawing Fig. 1 is a diagram illustrating an optical polarizing system according to the invention.

Figs. 2 and 3 illustrate modifications.

In Fig. 1 the numeral 5 indicates the vertical optical axis of the microscope. The objective is shown at 2 and an analyzing prism at 6. A source of light is indicated at 7 and 1 is the deflecting prism, preferably of high reflecting power, for deflecting the incoming light in a direction perpendicular to the plane of observation of the object downward through the objective to illuminate an object 3.

The polarizing element 4 for polarizing the deflected light is placed between the prism 1 and the objective 2.

According to the nature of the surface of the object a greater or lesser portion of the rays which impinge upon the surface passes by reflection or diffraction back to the observing eye through the objective.

The polarizing element which must be located in the rear pupil of the objective is suitably limited in area or size to avoid vignetting as will be understood.

The polarized light rays which illuminate the objects have their polarization condition influenced by the optical characteristics of the object. The polarization condition may then be determined by means of the analyzer or other suitable means which are located in the image forming rays behind the objective.

Fig. 2 illustrates a modification in which the prism 1 and the polarizer 4 are cemented together.

Fig. 3 shows the polarizer 4 mounted in a support 8 having pivot pins 9 whereby the polarizer may be adjustably mounted below the prism 1 in an obvious manner.

I claim:

1. A system for microscopic examination of anisotropic substances by incident polarized light in which the illuminating rays pass through the objective in a direction substantially normal to the plane of observation of the object, comprising a source of light, a microscope objective, means for deflecting the light beam from said light source towards the objective in a direction substantially normal to the plane of observation of an object to illuminate said object, a polarizing element positioned between said deflecting means and said objective in the exit pupil thereof and an analyzing element positioned in the path of said illuminating rays which are reflected by the object into the objective and pass through the latter to form an image of the object.

2. A polarized optical system according to claim 1 characterized by that the illuminating polarized rays from the source of light pass downward through the objective within the bundle of image forming rays which are reflected from the object into the objective.

MAX BEREK.